US011830154B2

(12) United States Patent
Miao et al.

(10) Patent No.: US 11,830,154 B2
(45) Date of Patent: Nov. 28, 2023

(54) AR-BASED INFORMATION DISPLAYING METHOD AND DEVICE, AR APPARATUS, ELECTRONIC DEVICE AND MEDIUM

(71) Applicants: Beijing BOE Optoelectronics Technology Co., Ltd., Beijing (CN); BOE Technology Group Co., Ltd., Beijing (CN)

(72) Inventors: Jinghua Miao, Beijing (CN); Yanqiu Zhao, Beijing (CN); Qingwen Fan, Beijing (CN); Xuefeng Wang, Beijing (CN); Wenyu Li, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/489,122

(22) Filed: Sep. 29, 2021

(65) Prior Publication Data

US 2022/0207836 A1      Jun. 30, 2022

(30) Foreign Application Priority Data

Dec. 25, 2020   (CN) .......................... 202011569071.5

(51) Int. Cl.
*G06T 19/00*        (2011.01)
*G06F 16/58*       (2019.01)
(Continued)

(52) U.S. Cl.
CPC ........ *G06T 19/006* (2013.01); *G06F 16/5866* (2019.01); *G10L 15/22* (2013.01); *G10L 17/02* (2013.01); *G10L 2015/227* (2013.01)

(58) Field of Classification Search
None
See application file for complete search history.

(56) References Cited

U.S. PATENT DOCUMENTS 10,248,981 B1 *   4/2019   Dallas ................ G06Q 30/0643
10,594,757 B1 *   3/2020   Shevchenko ........... G06F 40/35
(Continued)

FOREIGN PATENT DOCUMENTS

CN          107945806 A          4/2018
CN          109446876 A          3/2019
(Continued)

OTHER PUBLICATIONS

Encyclopedia Britannica, "Tone", 2009, retrieved from "https://www.britannica.com/topic/tone-speech" (Year: 2009).*

(Continued)

*Primary Examiner* — Michael J Cobb
(74) *Attorney, Agent, or Firm* — IPro, PLLC

(57) ABSTRACT

The application provides an AR-based information displaying method and an AR apparatus, an electronic device and a storage medium, applicable to the technical field of computers. The method comprises: acquiring voice information and a user image of a user; identifying the voice information and extracting user characteristics; and when the user image matches the user characteristics, displaying, by an AR displaying device, target information associated with the user at a display position corresponding to the user image, wherein the target information comprises at least one of user information and voice associated information. According to this solution, the user information and voice associated information of the user are displayed by the AR displaying device at the display position corresponding to the user image, so a user wearing the AR displaying device may give a pertinent reply after conveniently knowing user informa- (Continued)

tion and statement intentions of a speaker, improving the communication efficiency of users.

10 Claims, 4 Drawing Sheets

(51) Int. Cl.
*G10L 15/22* (2006.01)
*G10L 17/02* (2013.01)

(56) References Cited

U.S. PATENT DOCUMENTS

| | | | | |
|---|---|---|---|---|
| 10,692,297 | B2* | 6/2020 | Duan | H04M 1/72427 |
| 10,891,969 | B2* | 1/2021 | Huang | G10L 21/10 |
| 11,200,742 | B1* | 12/2021 | Post | G06T 19/003 |
| 2014/0139551 | A1* | 5/2014 | McCulloch | G09G 5/377 |
| | | | | 345/633 |
| 2016/0378861 | A1* | 12/2016 | Eledath | G06V 20/52 |
| | | | | 707/766 |
| 2018/0075659 | A1* | 3/2018 | Browy | G02B 27/017 |
| 2019/0147889 | A1 | 5/2019 | Cheng et al. | |
| 2020/0075011 | A1 | 3/2020 | Yao | |
| 2021/0271882 | A1* | 9/2021 | Waicberg | H04L 65/1069 |
| 2022/0247940 | A1* | 8/2022 | Springer | H04N 21/2187 |

FOREIGN PATENT DOCUMENTS

| | | |
|---|---|---|
| CN | 110767226 A | 2/2020 |
| CN | 111460418 A | 7/2020 |
| WO | 2017107758 A1 | 6/2017 |

OTHER PUBLICATIONS

Kaleigh Rodgers, "Augmented Reality App Can Translate Sign Language into Spoken English, and Vice Versa", 2018, Motherboard by Vice, retrieved from "https://www.vice.com/en/article/zmgnd9/app-to-translate-sign-language" (Year: 2018).*
CN202011569071.5 first office action and search report.

* cited by examiner

AR-BASED INFORMATION DISPLAYING METHOD AND DEVICE, AR APPARATUS, ELECTRONIC DEVICE AND MEDIUM

CROSS REFERENCE TO RELEVANT DISCLOSURES

The present disclosure claims the priority of the Chinese patent disclosure filed on Dec. 25, 2020 before the Chinese Patent Office with the disclosure number of 202011569071.5 and the title of "AR-BASED INFORMATION DISPLAYING METHOD AND DEVICE, AR APPARATUS, ELECTRONIC DEVICE AND MEDIUM", which is incorporated herein in its entirety by reference.

TECHNICAL FIELD

The application relates to the technical field of computers, and in particular relates to an AR information displaying method and device, an AR apparatus, an electronic device and a medium.

BACKGROUND

Along with the development of information technologies, diversified means may be used by people to acquire information through electronic devices. People may view information to acquire various required information through the electronic devices. For example, when giving a lecture or a speech or participating in an exchange meeting, people may deliver a speech by knowing an intention of a communication object through searching for information and getting a knowledge of other people's information with a teleprompter, a computer, a mobile phone, etc.

In scenarios of high-end meetings or speeches, users are unable to search for information with conspicuous electronic devices such as the teleprompter, computer, mobile phone, etc. However, since the field is crowded and noisy, people are even unable to hear clearly without the assistance from the electronic devices, which directly affects the efficiency of communication between users.

SUMMARY

The embodiments of the application provide an AR-based information displaying method and device, an electronic device and a storage medium.

According to a first aspect of the application, an AR-based information displaying method is provided, comprising:
Acquiring voice information and a user image of a user;
Identifying the voice information and extracting user characteristics; and
When the user image matches the user characteristics, displaying, by an AR displaying device, target information associated with the user at a display position corresponding to the user image, wherein the target information comprises at least one of user information and voice associated information.

According to a second aspect of the application, an AR-based information displaying device is provided, comprising:
An acquisition module, configured to acquire voice information and a user image of a user;
An identification module, configured to identify the voice information and extract user characteristics; and
A display module, configured to, when the user image matches the user characteristics, display, by an AR displaying device, target information associated with the user at a display position corresponding to the user image, wherein the target information comprises at least one of user information and voice associated information.

According to a third aspect of the application, an AR apparatus is provided, comprising an AR displaying device, an audio acquisition module, an image acquisition module and a processor; wherein
The audio acquisition module is configured to acquire voice information of a user;
The image acquisition module is configured to acquire a user image of the user;
The processor is configured to identify the voice information and extract user characteristics; and
The AR module is configured to, when the user image matches the user characteristics, display, by the AR displaying device, target information associated with the user at a display position corresponding to the user image, wherein the target information comprises at least one of user information and voice associated information.

According to a fourth aspect of the application, an electronic device is provided, comprising a processor, a memory and a program or instruction which is stored in the memory and is capable of being run in the processor, wherein when the program or instruction is executed by the processor, the AR-based information displaying method according to the first aspect is executed.

According to a fifth aspect of the application, a computer-readable storage medium is provided, having a computer program stored therein, wherein when the computer program is executed by a processor, the AR-based information displaying method according to according to the first aspect is executed.

For the prior art, the application has the following advantages:

An AR-based information display method, device, AR device, electronic device and medium provided in this application, The scheme shows the wearer of the AR display device while communicating with other users, By collecting voice information and user images from other users, When the user features in the voice information match the user image, Determine that the voice message is sent by the user in the user image, Thus, the AR display device displays at least one of the user information and the voice association information of the user at the display position corresponding to the user image, Make the user wearing the AR display device can easily understand the user information and intention of the speaking user and make a targeted reply, Improve the efficiency of user communication.

The technical solution of the application is merely summarized above. To ensure that the technical means of the application is understood more clearly, the contents of the application may be implemented. To make the above purposes, features and advantages of the application clearer and easily understood, the embodiments of the application will be described in further detail below.

BRIEF DESCRIPTION OF THE DRAWINGS

By reading the detailed description of the preferred embodiments thereinafter, all other advantages and beneficial effects are clearer to those ordinarily skilled in the art. The accompanying drawings merely illustrate the preferred embodiments, and shall not be construed as limiting the application. In all the drawings, identical reference symbols represent identical parts. In the drawings.

DETAILED DESCRIPTION

Exemplary embodiments of the application will be described in further detail with reference to the drawings. Although the accompanying drawings illustrate exemplary embodiments of the application, it should be understood that the application can be implemented in various forms, and shall not be construed as being limited by the embodiments described here. On the contrary, those embodiments are provided to help those skilled in the art understand the present disclosure more thoroughly and entirely convey the scope of the present disclosure to those skilled in the art.

Figure 1:
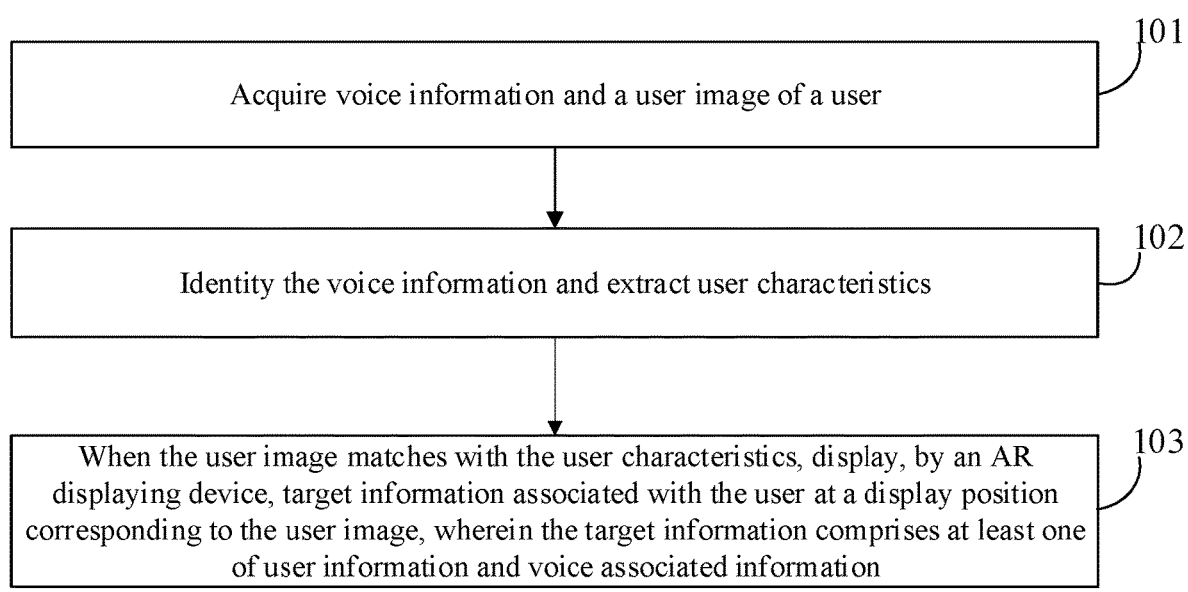
FIG. 1 illustrates a flowchart of an AR-based information displaying method according to the embodiments of the application.

FIG. 1 illustrates a flowchart of an AR-based information displaying method according to the embodiments of the application. The method comprises the following steps.

Step 101, voice information and a user image of a user are acquired.

According to the embodiments of the application, the voice information of the user may be audio information acquired using an audio acquisition device when the user speaks, and the user image may be an image of the user photographed with an image acquisition device or an image included in a video, for example, and may be a user avatar, a clothing image, a body photo, a half-length photo, etc., which may reflect an identity characteristic of the user. The voice information and user image may be both acquired in time from a speaker or pre-acquired from the speaker and then stored, or self-provided by the speaker or provided by users other than the speaker. The specific voice information and user image may be determined upon actual demands, and are not limited here.

The user image which reflects the user's identity and the voice information which reflects the contents of the user's statement may be obtained by acquiring, with the audio acquisition device and the image acquisition module, the voice information and user image of the speaker.

In actual application, this solution is applicable to scenarios such as a speech, school teaching, a meeting, a debate, etc. where users communicate face to face. When one user listens to another, the voice information and the user image of the speaker are acquired according to this solution.

Step 102, the voice information is identified, and user characteristics are extracted.

According to the embodiments of the application, the user characteristics are characteristic information in the voice information that reflects the user identity. The user characteristics may be semantic characteristics converted from the voice information into a voice text, for example, a name, an address, a company name, a position, a title, a nickname, etc., or may also be tone characteristics in the voice information, etc. The specific type of user characteristics may be set upon actual demands, and are not limited here.

The user characteristics which may reflect the user identity are extracted from the user's voice information. The specific operation may be understood with reference to the implementation in the prior art, and is not repeated here.

Step 103, when the user image matches the user characteristics, target information associated with the user is displayed by an AR displaying device at a display position corresponding to the user image, wherein the target information comprises at least one of user information and voice associated information.

According to the embodiments of the application, the AR (Augmented Reality) displaying device may a displaying device which displays virtual information and real visual information to the user in an integrated way, for example, AR glasses, an AR helmet, etc. The target information associated with the user may be user information, which may reflect the actual information of the user, for example, an image, a name, a company name, interest, a title, etc., and may also be voice associated information such as voice contents, translated contents, extended contents related to the contents of the user' statement.

Whether the voice information is sent from the user in the user image is determined based on of the user characteristics extracted from the voice information. For example, whether the voice information is sent from the user in the user image is determined by comparison between appearance characteristics matched with the user characteristics in the voice information and the user image, or by comparison between mouth actions of the speaker that are determined according to the user characteristics in the voice information and mouth actions of the user in the user image. Of course, whether the user image matches the user characteristics may be directly determined when the audio acquisition device and the image acquisition device acquire information from a same user. The specific manner to determine whether the voice information is sent from the user in the user image according to the user image and the user characteristics in the voice information may be determined upon actual demands, and is not limited here, In actual application, when a user wearing the AR displaying device communicates with a speaker, the audio acquisition device and the image acquisition device respectively acquire the voice information and user image of the speaker, and after it is determined that the voice information is sent from a user in the user image, the user in the user image is determined as the speaker; then, the user information, the voice associated information, etc. is displayed by the AR displaying device at the displaying position corresponding to the user image. Therefore, the user wearing the AR apparatus may know the details and intentions of the speaker from the AR displaying device. The user wearing the AR displaying device is helped to better exchange with other users with assistance.

According to the embodiments of the application, the AR-based information displaying method is as follows: when the user wearing the AR displaying device exchanges with other users, the voice information and user images of other users are acquired first; then, when the user characteristics in the voice information match the user characteristics, it is determined that the voice information is sent from the user in the user image; next, at least one of the user information and voice associated information of the user is displayed by the AR displaying device at the displaying position corresponding to the user image. By this method, the user wearing the AR displaying device may give a pertinent reply after conveniently knowing the user information and statement intentions of the speaker, improving the communication efficiency of users.

Figure 2:
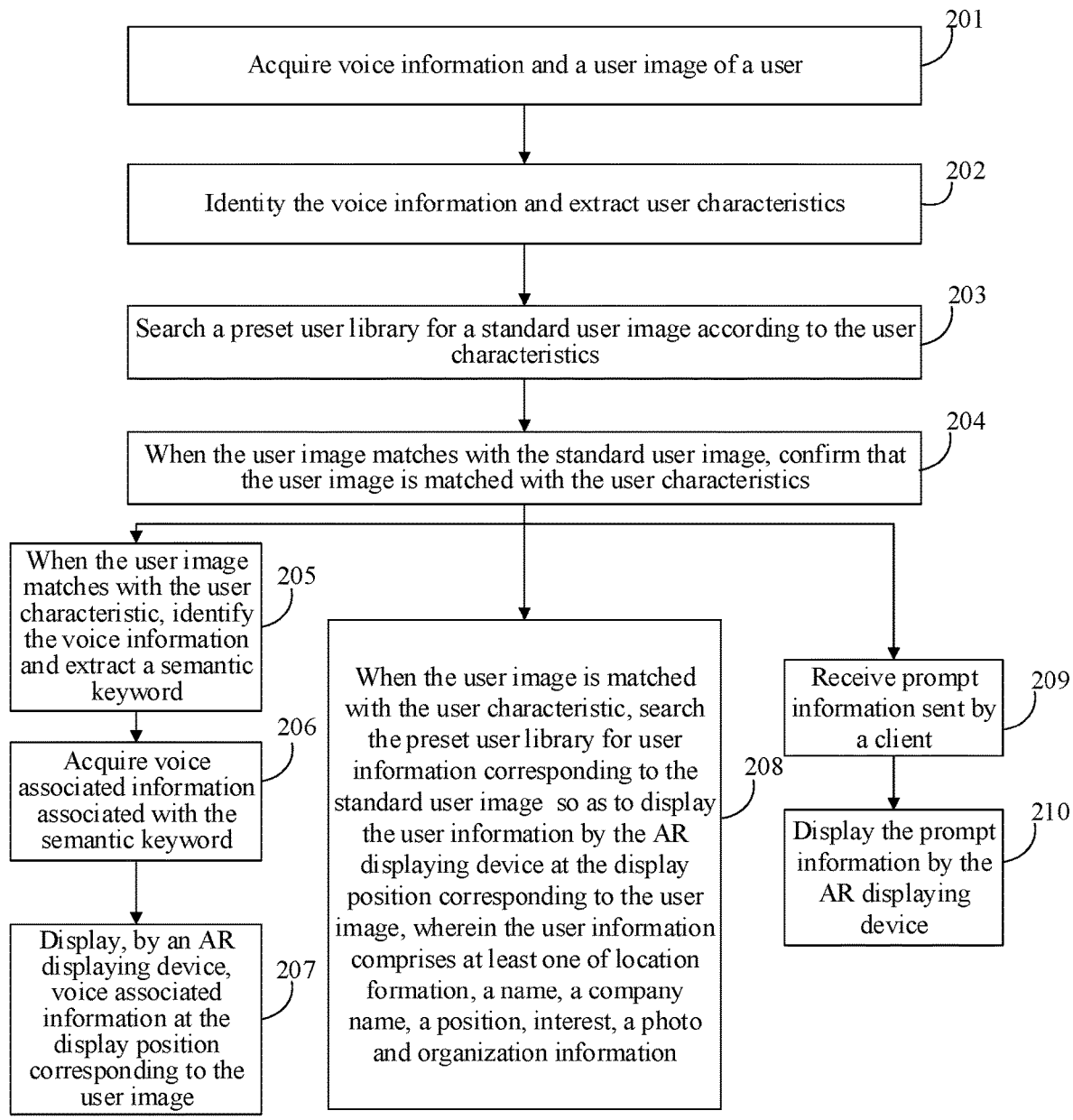
FIG. 2 illustrates a flowchart of another AR-based information displaying method according to the embodiments of the application.

FIG. 2 illustrates a flowchart of another AR-based information displaying method according to the embodiments of the application. The method comprises the following steps.

Step 201, voice information and a user image of a user are acquired.

This step may be understood with reference to the detailed description of step 101, and is not repeated here.

Step 202, the voice information is identified, and user characteristics are extracted.

This step may be understood with reference to the detailed description of step 102, and is not repeated here.

Step 203, a standard user image is searched for in a preset user library according to the user characteristics.

According to the embodiments of the application, a standard user image is a user image for reference. The standard user image may be a high-quality image of the user photographed using a high-resolution image acquisition device under an appropriate lighting condition. Of course, the standard user image may also be an identification photo self-provided by the user. The user image should clearly reflect the user characteristics of the user. The preset user library is a database obtained by establishing in advance an associating relation between the standard user image and the user characteristics of the user. The preset user library is used for later search.

Optionally, when the user characteristics include a semantic keyword characteristic, the preset user library includes a corresponding relation between the standard user image and an identity keyword characteristic, and step 203 may comprise searching the preset user library for the standard user image corresponding to a target identity keyword characteristic, wherein the target identity keyword characteristic matches the semantic keyword characteristic.

According to the embodiments of the application, the contents of the voice information may be analyzed and converted into a voice text, and then the semantic keyword characteristic for expressing the voice contents may be extracted from the voice text. The extracted semantic keyword characteristics may be searched for in the preset user library. The target identity keyword matched with the semantic keyword characteristic may be obtained by searching for the identity keyword characteristic, so that a standard user image corresponding to the target identity keyword characteristic is used as the standard user image of the user which sends the voice information. Here, it should be noted that, it is not necessarily that one standard user image is matched, and two or more standard user images may be matched, because the identity characteristics reflected by a single identity keyword characteristic may match one or more users.

Therefore, a plurality of standard user images may be matched.

According to the embodiments of this application, the semantic keyword characteristic in the voice information matches the standard user image in the preset user library to facilitate subsequent identification of whether the user characteristic in the user voice matches the user image, thereby improving the accuracy of matching between the user voice and user image.

Optionally, when the user characteristics include a tone characteristic, the preset user library comprises a corresponding relation between the standard user image and a standard tone characteristic. Step 204 may comprise: searching the preset user library for the standard user image corresponding to a target tone characteristic, wherein the target tone characteristic matches the tone characteristic.

According to the embodiments of the application, voice textures in the voice information may be analyzed to extract the tone characteristic in the voice information. The preset user library may acquire and analyze the voice of the user in advance to obtain the standard tone characteristic of the user, and then stores the standard tone characteristic associated with the standard user image. Then, after acquiring the voice information of the user, the preset user library may match the tone characteristic of the speaker that is extracted from the voice information and the standard tone characteristic stored therein, and determine the standard user image corresponding to the matched target standard tone characteristic as the standard user image of the user who sends the voice information for later matching. It should be noted that, since the quality of the acquired voice information is uncertain, the matching percentage may be properly adjusted to ensure that the matching result is obtained each time during matching of the target tone characteristic. Of course, the same voice information may match one or more target tone characteristics to obtain a plurality of standard user images.

According to the embodiments of this application, the tone characteristic in the voice information matches the standard user image in the preset user library to facilitate subsequent identification of whether the user characteristic in the user voice matches the user image, thereby improving the accuracy of matching between the user voice and user image.

Step 204, when the user image matches the standard user image, the user image is confirmed to match the user characteristics.

According to the embodiments of the application, the user image and the standard user image may be matched by image matching methods based on, for example, a template, a singular value characteristic, sub-control analysis or an artificial neural net, as long as long as the standard user image identical with the user in the user image are capable of being accurately distinguished. The specific image matching method may be understood with reference to the conventional image matching method in the field, and is not repeated here. When the user image and the standard user image of the user are successfully matched, it may be confirmed that the voice information is sent from the user in the user image, so that it is determined that the user image matches the user characteristic in the voice information.

According to the embodiments of the application, the user image and the user characteristic in the voice information are matched with the assistance of the standard user image stored in the preset user library and associated with the user characteristic in the voice information, thereby improving the accuracy of determining the user image of the user who sends the voice information.

Step 205, when the user image matches the user characteristic, the voice information is identified, and a semantic keyword is extracted.

Step 206, voice associated information associated with the semantic keyword is acquired.

According to the embodiments of the application, the semantic keyword may be a keyword which reflects contents of real-time voice information. A semantic characteristic in the voice information may be analyzed, and an extracted keyword associated with the semantic characteristic may be used as the semantic keyword. Of course, a specific keyword may be designated to extract the semantic keyword. The specific semantic keyword may be determined upon actual demands and is not limited here.

Step 207, voice associated information is displayed by the AR displaying device at the display position corresponding to the user image.

According to the embodiments of the application, the semantic keyword may be converted into texts such as questions and statements, which are used as the voice associated information, so that the user wearing the AR displaying device may clearly know the contents expressed by the speaker through the AR displaying device. Of course, information associated with the semantic keyword that is searched for from local data or remote data may be used as the voice association information, so that the user may comprehensively know the information related to the statement of the speaker by checking the voice associated information. Of course, the voice associated information associated with the semantic keyword may also be acquired by other means as long as these means help the user know and reply real-time voice information. The specific means are not limited here.

According to the embodiments of the application, a virtual image of the voice associated information may be added to the periphery of the user image of the speaker, so that a user wearing the AR displaying device may check the contents related to the voice information of the speaker through the AR displaying device. For example, field communication usually occurs when a speed is delivered, and an audience may ask a keynote speaker questions, but the keynote speaker may fail to know the questions of the audience in time because of the audience's accent or the noisy environment. Under such a circumstance, the keynote speaker may wear the AR displaying device to receive the voice information of the audience. The AR displaying device displays the voice associated information obtained by analyzing the voice information, so the keynote speaker may accurately know the question of the audience in time, and even relevant answers to questions, etc.

According to the embodiments of the application, the voice associated information obtained by analyzing the semantic keyword in the voice information is displayed by the AR displaying device for user's reference, so that the user may accurately and comprehensively know the contents related to the real-time voice information.

Optionally, step 207 may comprise searching for contents associated with the semantic keyword from preset multimedia contents, and determining a searched result as the voice associated information.

According to the embodiments of the application, the preset multimedia contents refer to contents displayed in form of video, audio, and audio-video. The preset multimedia contents may be self-set by the user wearing the AR displaying device, or automatically preset by the system. The specific preset multimedia contents may be determined upon actual demands, and are not limited here, In actual application, the user wearing the AR displaying device usually communicates with other users based on the preset multi-media contents. In the communication process, the voice information of other users may be involved with specific contents of the preset multimedia contents. Under such a circumstance, to help the user wearing the AR displaying device check the specific contents, the semantic keyword in the acquired voice information is used to do a search within the preset multimedia contents, and the searched multimedia contents are used as the voice associated information and displayed by the AR displaying device.

Exemplarily, when a speech is delivered, after an audience in field asks a question related to specific contents in a PPT (a computer file generated by PowerPoint, a slide-show presentation software developed by Microsoft Corporation), the specific contents may be searched for in the PPT by analyzing semantic keyword in the voice information acquired from the audience, for example, the semantic keyword related to the contents of the PPT such as a section, a page, a paragraph, a row and a title. The searched PPT contents are displayed to the user wearing the AR displaying device, so that the user wearing the AR displaying device may check the PPT contents related to the question of the audience in time, thus facilitating subsequent answering and communication.

According to the embodiments of the application, by using a part of the preset multimedia contents associated with the semantic keyword in the voice information used as the voice associated information and displaying the contents to the user wearing the AR displaying device, the user wearing the AR displaying device may check the multimedia contents related to the exchanged contents in time, improving the information display flexibility of the AR displaying device.

Optionally, step 207 may comprise performing retrieving according to the semantic keyword, and determining the retrieved contents as the voice associated information.

According to the embodiments of the application, during searching for the voice associated information associated with the semantic keyword, local data may be not searched out or only a little information is searched out occasionally, which fails to meet the actual demand. Under such a circumstance, an external database or a specific website may be searched for according to the semantic keyword extracted from the voice information, and the searched result is determined as the voice associated information, thus improving the abundance of voice associated information.

Exemplarily, when a speech is delivered, some audiences may occasionally ask some questions that are not related to the speech of the speaker and the speaker does not know to the speaker. Under such a circumstance, websites or designated database may be searched according to the voice information, and the searched result is showed to the speaker by the AR displaying device, so that the speaker may give a reply after accurately knowing the contents related to the audiences' questions.

Thus it can be seen that, according to the embodiments of the application, the semantic keyword may be used for retrieving, thereby improving the abundance of voice associated information to be displayed.

Step 208, when the user image matches the user characteristic, user information corresponding to the standard user image is searched for in the preset user library, to display the user information by the AR displaying device at the display position corresponding to the user image, wherein the user information comprises at least one of location formation, a name, a company name, a position, interest, a photo and organization information.

According to the embodiments of the application, the preset user library is pre-stored with the standard user image and corresponding user information, so when the standard user image matches the user image, the user information corresponding to the standard user image may be displayed by the AR displaying device, wherein the user information includes but is not limited to the location information, a name, a company name, a position, interest, a photo, organization information, etc. By displaying the virtual image of the user information in the periphery of the user image, the user may accurately check the user information of each of users in time through an AR device.

Exemplarily, when a speech is delivered, a keynote speaker may fail to hear clearly the personal introduction of an audience who talks to the keynote speaker because the field is noisy and crowded, so the keynote speaker may wear the AR displaying device to acquire the voice information and user images of the audiences. The user information corresponding to each of user images of the audiences is determined through comparison with standard user images in the preset user library, and displayed to the keynote speaker by the AR displaying device, so that the keynote speaker may accurately know the user information of each of the audiences in time.

According to the embodiments of the application, the AR displaying device displays the user information at the display position corresponding to the user image, so that the user wearing the AR displaying device may conveniently know the user information in real time through the AR displaying device.

Step 209, prompt information sent by a client is received.

According to the embodiments of the application, the client refers to a client in a communicating connection with the AR displaying device. The client may send designated information to the AR displaying device for reference of the user wearing the AR displaying device.

Step 210, the prompt information is displayed by the AR displaying device.

According to the embodiments of the application, users other than the user wearing the AR displaying device may send also prompt information to the AR displaying device, and the AR displaying device displays the prompt information to the user wearing the AR displaying device for reference.

In actual application, for example, when a speech is delivered, if the keynote speaker wearing the AR displaying device forgets speech contents or is unable to answer questions during exchange with audiences in field, or working staff off the stage want to inform the keynote speaker of specific affairs or provide off-stage assistance to the keynote speaker, prompt information may be sent from the client to the AR displaying device, and the AR displaying device displays the prompt information, so that the keynote speaker may obtain off-site information assistance in time.

According to the embodiments of the application, by displaying, through the AR displaying device, the prompt information received from the client, the user wearing the AR displaying device may obtain prompt information sent by other users via the client, improving the information display flexibility of the AR displaying device.

According to another embodiment of the application, another AR-based information displaying method is as follows: when the user wearing the AR displaying device exchanges with other users, the voice information and user images of other users are acquired first; then, when the user characteristics in the voice information match the user characteristics, it is determined that the voice information is sent from the user in the user image; and finally, at least one of the user information and voice associated information of the user may be displayed by the AR displaying device at the displaying position corresponding to the user image. By this method, the user wearing the AR displaying device may give a pertinent reply after conveniently knowing user information and statement intentions of the speaker, improving the communication efficiency of users. Moreover, the user image and the user characteristic in the voice information match the assistance of the standard user image stored in the preset user library and associated with the user characteristic in the voice information, thereby improving the accuracy of determining the user image of the user who sends the voice information. Moreover, by displaying part of the preset multimedia contents or searched result associated with the semantic keyword in the voice information, as the voice associated information, to the user wearing the AR displaying device, the user wearing the AR displaying device may check the multimedia contents related to the exchanged contents in time, improving the information display flexibility of the AR displaying device. Moreover, by displaying, through the AR displaying device, the prompt information received from the client, the user wearing the AR displaying device may obtain prompt information sent by other users via the client, improving the information display flexibility of the AR displaying device.

Figure 3:
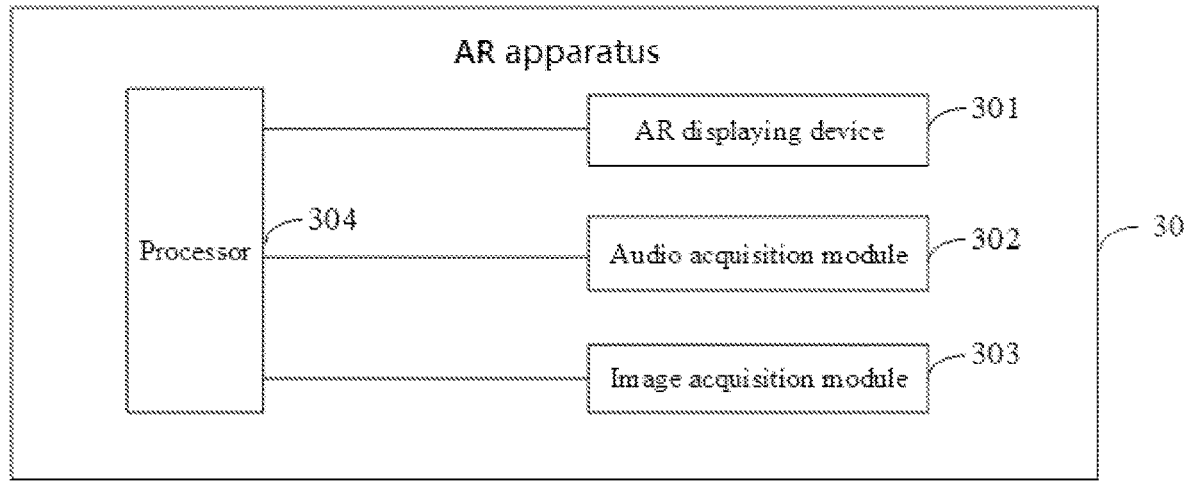
FIG. 3 is a structural block diagram of an electronic device according to the embodiments of the application.

FIG. 3 is a structural block diagram of an AR apparatus 30 according to the embodiments of the application. The AR apparatus 30 comprises an AR displaying device 301, an audio acquisition module 302, an image acquisition module 303 and a processor 304; wherein The audio acquisition module 302 is configured to acquire voice information of a user;

The image acquisition module 303 is configured to acquire a user image of the user;

The processor 304 is configured to identify the voice information, extract user characteristics, and search a preset user library for a standard user image according to the identity keyword; and The AR displaying module 301 is configured to, when the user image matches the user characteristics, display target information associated with the user, wherein the target information comprises at least one of user information and voice associated information.

According to the embodiments of the disclosure, the AR displaying device may be a device with an AR image displaying function, for example AR glasses, an AR helmet, etc.; the audio acquisition module may be a device with an audio acquisition function, for example, a microphone, and the image acquisition module may be a device with an image acquisition function, for example a camera, a telecamera, etc.; and, the processor may be a device with data transmission, processing and storage functions, etc., for example a mobile phone, a multi-media box, a tablet computer, a personal computer, etc. In actual application, the AR displaying device, the audio acquisition module and the image acquisition module may be in a communicating connection with the processor, so that the processor may drive the AR displaying device, the audio acquisition module and the image acquisition module to work. The audio acquisition module and the image acquisition module may be arranged on the AR displaying device, so that when the user wearing the AR displaying device communicates with other users, the two modules may acquire the voice information and user information of other users. Of course, the audio acquisition module and the image acquisition module may also be arranged independent from the AR displaying device, as long as the voice information and user images of users who communicate with the user wearing the AR displaying device are capable of being acquired. The specific arrangement mode is not limited here. Further, the processor may also be arranged on the AR displaying device, such that the AR displaying device runs independent from an external server, or the processor may also be arranged in the server independent from the AR displaying device and performs a communicating connection with the AR displaying device through a local area network server or a wide area network server, and the AR displaying device may log, by verification means, such as an account password, onto the server where the processor is located, to obtain AR display images from the processor.

According to the embodiments of the application, the AR apparatus may, when the user wearing the AR displaying device exchanges with other users, acquire the voice information and user images of other users first, then determine, when the user characteristics in the voice information match the user characteristics, that the voice information is sent from the user in the user image, and finally display, by the AR displaying device, at least one of the user information and voice associated information of the user at the displaying position corresponding to the user image, so that the user wearing the AR displaying device may give a pertinent reply after conveniently knowing user information and statement intentions of the speaker, improving the communication efficiency of users.

Figure 4:
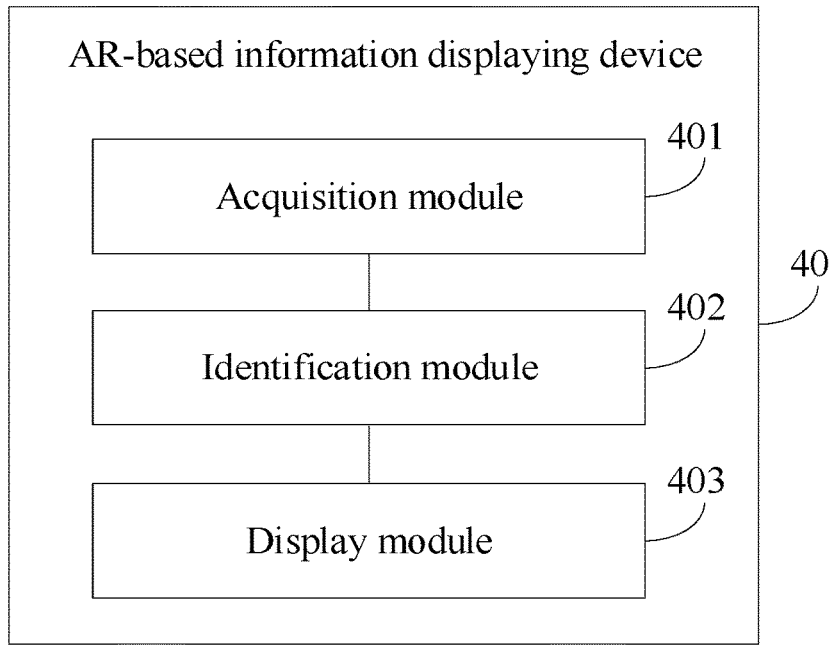
FIG. 4 illustrates a structural block diagram of an AR-based information displaying device according to the embodiments of the application.
Figure 5:
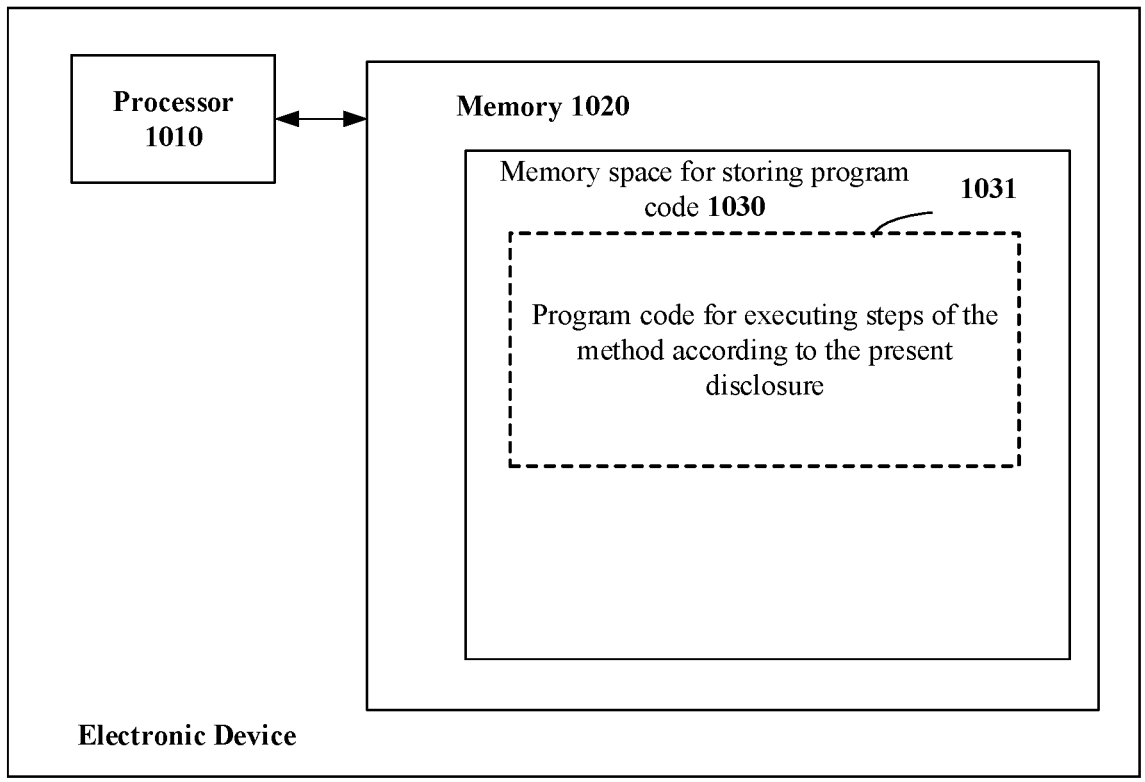
FIG. 5 schematically illustrates a block diagram of an electronic device for performing the method according to the present disclosure.
Figure 6:
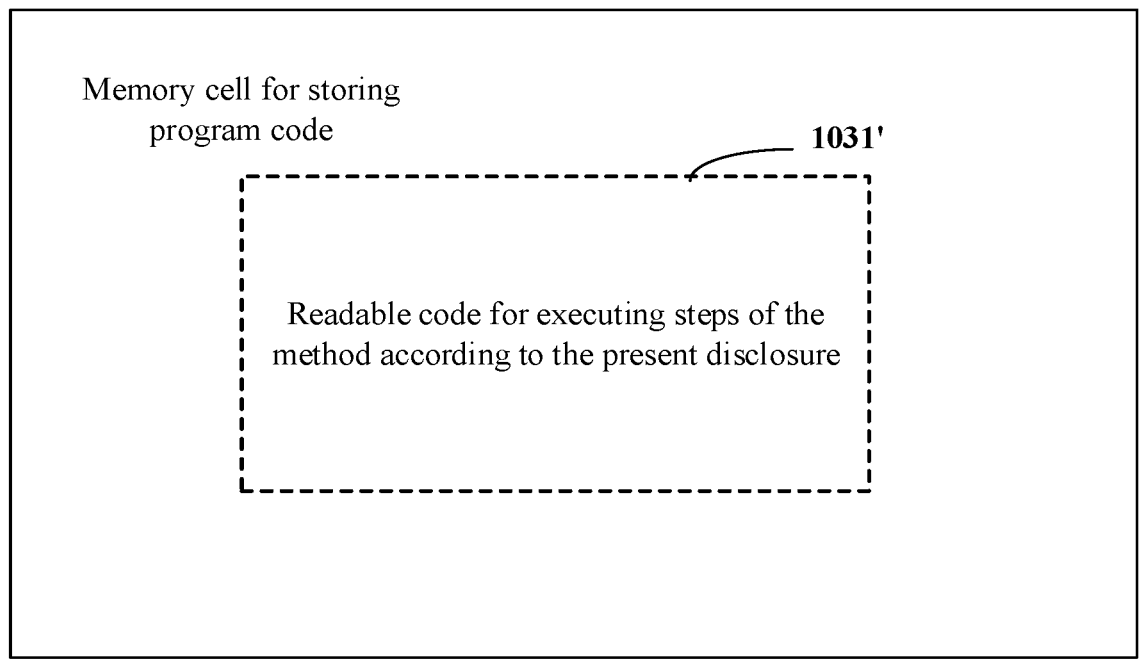
FIG. 6 schematically illustrates a memory cell for maintaining or carrying a program code for implementing the method according to the present disclosure.

FIG. 4 illustrates a structural block diagram of an AR-based information displaying device according to the embodiments of the application. The device comprises:

an acquisition module 401, configured to acquire voice information and a user image of a user;

an identification module 402, configured to identify the voice information and extract user characteristics; and a display module 403, configured to, when the user image matches the user characteristics, display, by an AR displaying device, target information associated with the user at a display position corresponding to the user image, wherein the target information comprises at least one of user information and voice associated information.

Optionally, the identification module 402 is further configured to:

search a preset user library for a standard user image according to the user characteristics; and when the user image matches the standard user image, confirm that the user image matches the user characteristics.

Optionally, when the user characteristics include a semantic keyword characteristic, the preset user library comprises a corresponding relation between the standard user image and an identity keyword characteristic;

The identification module 402 is further configured to:

Search the preset user library for the standard user image corresponding to a target identity keyword characteristic, wherein the target identity keyword characteristic matches the semantic keyword characteristic.

Optionally, when the user characteristics include a tone characteristic, the preset user library comprises a corresponding relation between the standard user image and a standard tone characteristic.

The identification module 402 is further configured to:

search the preset user library for the standard user image corresponding to a target tone characteristic, wherein the target tone characteristic matches the tone characteristic.

Optionally, when the target information comprises voice associated information, the display module 403 is further configured to:

identify the voice information and extract a semantic keyword;

acquire voice associated information associated with the semantic keyword;

display, by an AR displaying device, voice associated information at the display position corresponding to the user image.

Optionally, the display module 403 is further configured to search preset multimedia contents for contents associated with the semantic keyword, and determine the searched result as the voice associated information.

Optionally, the display module 403 is further configured to retrieve according to the semantic keyword, and determine the retrieved result as the voice associated information.

Optionally, when the target information comprises user information, the display module 403 is further configured to search the preset user library for user information corresponding to the standard user image to display the user information by the AR displaying device at the display position corresponding to the user image, wherein the user information comprises at least one of location information, a name, a company name, a position, interest, a photo and organization information.

Optionally, the device further comprises a receiving module which is configured to:

Receive prompt information sent by a client.

The prompt information is displayed by the AR displaying device.

According to the embodiments of the application, the AR information displaying device may, when the user wearing the AR displaying device exchanges with other users, acquire the voice information and user images of other users first, then determine, when the user characteristics in the voice information match the user characteristics, that the voice information is sent from the user in the user image, and finally display, by the AR displaying device, at least one of the user information and voice associated information of the user at the displaying position corresponding to the user image, so that the user wearing the AR displaying device may give a pertinent reply after conveniently knowing user information and statement intentions of the speaker, improving the communication efficiency of users.

According to the embodiments of the application, an electronic device is provided, comprising a memory and a program or an instruction which is stored in the memory and is capable of being run in the processor, wherein when the program or instruction is executed by the processor, any one of the above-mentioned AR-based information displaying methods is executed.

According to the embodiments of the application, the electronic device may, when the user wearing the AR displaying device exchanges with other users, acquire the voice information and user images of other users first, then determine, when the user characteristics in the voice information match the user characteristics, that the voice information is sent from the user in the user image, and finally display, by the AR displaying device, at least one of the user information and voice associated information of the user at the displaying position corresponding to the user image, so that the user wearing the AR displaying device may give a pertinent reply after conveniently knowing user information and statement intentions of the speaker, improving the communication efficiency of users.

According to the embodiments of the application, a computer-readable storage medium is provided, having a computer program stored therein, wherein when the computer program is executed by a processor, the AR-based information displaying method is executed.

According to the embodiments of the application, the computer storage medium may, when the user wearing the AR displaying device exchanges with other users, acquire the voice information and user images of other users first, then determine, when the user characteristics in the voice information match the user characteristics, that the voice information is sent from the user in the user image, and finally display, by the AR displaying device, at least one of the user information and voice associated information of the user at the displaying position corresponding to the user image, so that the user wearing the AR displaying device may give a pertinent reply after conveniently knowing user information and statement intentions of the speaker, improving the communication efficiency of users.

Those skilled in the art may understand that the application comprises devices for implementing one or more of operations in the application. These devices may be designed and manufactured for fulfilling special purposes, or may comprise known units in all-purpose computers. These devices have computer programs stored therein. These computer programs are selectively activated or re-configured. Such computer programs may be stored in storage mediums of devices (for example, computers) or in any type of mediums that are suitable for storing electronic instructions and are respectively coupled to a bus. The computer storage mediums include but are not limited to any type of disks (including floppy disks, hard disks, optical disks, CD-ROM and magneto-optical disks, ROMs (Read-Only Memories), RAMs (Random Access Memories), EPROMs (Erasable Programmable Read-Only Memories), EEPROMs (Electrically Erasable Programmable Read-Only Memories), flash memories, magnetic cards and optical fiber cards. That is, the storage mediums include any mediums in which information may be stored or transmitted in a way of being read by devices (for example, computers).

Those skilled in the art may understand that, computer program instructions may be used to implement each or combinations of blocks in these structural drawings and/or block diagrams and/or flowchart. Those skilled in the art may understand that, these computer program instructions may supplied to and implemented by all-purpose computers, professional computers or other processors which program the AR-based information displaying method, so that the all-purpose computers or other processors which program the AR-based information displaying method implement the solutions designated in one or more of blocks in the structural drawings and/or block diagrams and/or flowchart disclosed in the application.

The above embodiments are merely specific ones of the application, and should not be construed as limitations to the protective scope of the application. Those ordinarily skilled in the art may easily make variations and amendments to the above embodiments within the scope of the application, and all those variations and amendments shall fall within the protective scope of the application. Therefore, the protective scope of the application shall be subject to that of the claims.

The invention claimed is:

1. An AR-based information displaying method, comprising:
   acquiring voice information and a user image of a user;
   identifying the voice information and extracting user characteristics; and
   when the user image matches the user characteristics, displaying, by an AR displaying device, target information associated with the user at a display position corresponding to the user image, wherein the target information comprises at least one of user information and voice associated information;
   wherein the method further comprises:
   prompt information sent by a client is received, wherein the client is in a communicating connection with the AR displaying device, and the client is used by a user other than the user wearing the AR displaying device to send the prompt information to the AR displaying device, whereby the prompt information is displayed to the user wearing the AR displaying device for reference by the user wearing the AR displaying device; and
   the prompt information is displayed by the AR displaying device.

2. The method according to claim 1, wherein when the user image matches the user characteristics, before the step of displaying, by an AR displaying device, target information associated with the user at a display position corresponding to the user image, the method further comprises:
   searching a preset user library for a standard user image according to the user characteristics; and
   when the user image matches the standard user image, confirming that the user image matches the user characteristics.

3. The method according to claim 2, wherein when the user characteristics comprise a semantic keyword characteristic, the preset user library comprises a corresponding relation between the standard user image and an identity keyword characteristic;
   the step of searching a preset user library for a standard user image according to the user characteristics comprises:
   searching the preset user library for the standard user image corresponding to a target identity keyword characteristic, wherein the target identity keyword characteristic matches the semantic keyword characteristic.

4. The method according to claim 2, wherein when the user characteristics comprise a tone characteristic, the preset user library comprises a corresponding relation between the standard user image and a standard tone characteristic;
   the step of searching a preset user library for a standard user image according to the user characteristics comprises:
   searching the preset user library for the standard user image corresponding to a target tone characteristic, wherein the target tone characteristic matches the tone characteristic.

5. The method according to claim 1, wherein when the target information comprise the voice associated information, the step of displaying, by an AR displaying device, target information associated with the user at a display position corresponding to the user image comprises:
   identifying the voice information and extracting a semantic keyword;
   acquiring voice associated information associated with the semantic keyword; and
   displaying, by the AR displaying device, voice associated information at the display position corresponding to the user image.

6. The method according to claim 5, wherein, the method further comprises:
   searching for contents associated with the semantic keyword from preset multimedia contents, and determining a searched result as the voice associated information.

7. The method according to claim 5, wherein, the method further comprises:
   performing retrieving according to the semantic keyword, and determining the retrieved contents as the voice associated information.

8. The method according to claim 1, wherein when the target information comprises the user information, the step of displaying, by an AR displaying device, target information associated with the user at a display position corresponding to the user image comprises:
   searching the preset user library for user information corresponding to the standard user image to display the user information by the AR displaying device at the display position corresponding to the user image, wherein the user information comprises at least one of location information, a name, a company name, a position, interest, a photo and organization information.

9. An electronic device, comprising a processor, a memory and a program or instruction which is stored in the memory and is capable of being run in the processor, wherein when the program or instruction is executed by the processor, the AR-based information displaying method according to claim 1 is executed.

10. A non-transitory nonvolatile computer-readable storage medium, wherein a computer program code in the storage medium is executable by a processor of an electronic device, whereby the electronic device is configured to perform operations comprising:
  acquiring voice information and a user image of a user;
  identifying the voice information and extracting user characteristics; and
  when the user image matches the user characteristics, displaying, by an AR displaying device, target information associated with the user at a display position corresponding to the user image, wherein the target information comprises at least one of user information and voice associated information;
  wherein the method further comprises:
  prompt information sent by a client is received, wherein the client is in a communicating connection with the AR displaying device, and the client is used by a user other than the user wearing the AR displaying device to send the prompt information to the AR displaying device, whereby the prompt information is displayed to the user wearing the AR displaying device for reference by the user wearing the AR displaying device.

* * * * *